United States Patent [19]
Pradervand

[11] 3,938,810
[45] Feb. 17, 1976

[54] CENTER HOLE FORMATION IN AN INFORMATION STORING DISC

[75] Inventor: Michel Pradervand, Geneva, Switzerland

[73] Assignee: RCA Corporation, New York, N.Y.

[22] Filed: Mar. 12, 1973

[21] Appl. No.: 340,605

[30] Foreign Application Priority Data
Apr. 19, 1972 United Kingdom............... 18043/72

[52] U.S. Cl................................................. 274/13 R
[51] Int. Cl.²......................................... G11B 17/06
[58] Field of Search ...... 274/13 R, 46, 42; 33/27 G, 33/27 C

[56] References Cited
UNITED STATES PATENTS

| 683,023 | 9/1901 | Donovan............................. 33/27 G |
| 1,195,101 | 8/1916 | Schiffman........................... 33/27 R |
| 1,246,925 | 11/1917 | Hunt..................................... 33/27 C |
| 2,142,563 | 1/1939 | Harris............................ 274/13 R X |
| 2,219,930 | 10/1940 | Kellogg.............................. 274/13 R |
| 3,535,182 | 10/1970 | Maletz................................ 274/42 R |
| 3,589,736 | 6/1971 | Gorman............................... 274/42 R |

FOREIGN PATENTS OR APPLICATIONS

| 2,066,862 | 8/1971 | France................................. 274/42 |

Primary Examiner—Harry N. Haroian
Attorney, Agent, or Firm—Eugene M. Whitacre; Stephen Siegel; William H. Meagher

[57] ABSTRACT

A video disc having signal information stored in a spiral groove, has a center hole formed by creating a closed convolution of predetermined diameter concentrically to said spiral groove and removing the disc material within this closed convolution.

5 Claims, 5 Drawing Figures

CENTER HOLE FORMATION IN AN INFORMATION STORING DISC

BACKGROUND OF THE INVENTION

This invention relates to video discs and more particularly to creating a center hole in such a disc that is concentric to a formed information storing spiral groove.

A typical method of forming a video disc suitable for reproducing information stored therein is described in a copending U.S. application in the name of Jon K. Clemens, Ser. No. 126,772, now U.S. Pat. No. 2,842,194, assigned to the same assignee as the present invention. According to the method described by Clemens, an aluminum disc is machined flat and a thin lacquer coating is formed on the machined surface. The lacquer formed on the surface of the disc is first strained through a series of micro-mesh filters and then poured over the surface of the disc while the disc is rotated at about 10 rpm. Disc rotation is continued until a smooth lacquer coating is formed on the metal surface when dried. After several days of drying, the lacquer surface is further machined flat in preparation for subsequent formation of a spiral, information-storing groove.

The lacquer-coated disc is then mounted for rotation about its apparent center on the turntable of a record cutting lathe and is rotated at a substantially constant velocity of about 15 rpm. Typically, a hole formed at about the center of the lacquer-coated disc is used as an aid to center the disc upon the turntable. A heated cutting stylus is positioned on the disc and a spiral groove is formed therein. Stylus heating is desirable to provide smooth cutting of the lacquer.

Signal information may be formed in the spiral groove of the disc by modulating the cutting stylus motion to form a signal-representative topography concurrently with the formation of the spiral groove. A similar method is utilized in the audio recording art and may be extended to video recording with the aid of a cutting stylus arrangement having a relatively high frequency response. Another method of forming an information-representative topography utilizes the beam of a scanning electron microscope to expose an electron beam sensitive material which is coated on a spiral grooved substrate. A system of the latter type is described in the above-mentioned patent of Jon K. Clemens.

After the spiral groove and topography have been formed in either the lacquer-coated disc or the disc coated with electron beam sensitive material, a metal replica is made thereof by methods known in the audio recording art. This metal replica, having groove and topography of opposite contour from that of the lacquer, may be used to stamp or emboss discs of, for example, thermoplastic material. The thermoplastic replica is then metalized to make the surface conducting and the metalization is thereafter coated with a dielectric. In playing back the recorded information, a metal-coated stylus is caused to ride in the dielectric-coated groove. This stylus, along with the metalization and dielectric, acts as a capacitor. Capacitance variations in the groove, which correspond to the recorded video information, are then detected electronically to recover the video information.

Video information typically is recorded on the disc in an image-line-sequential format requiring precise timing of each line with respect to others. A deviation in the linear velocity between the spiral groove and the signal pick-up stylus of the pressed or embossed record as compared with that existing during recording results in a non-linear presentation of the decoded signal information on a monitor, such as a television receiver. If the spiral information groove on the disc is not concentric with the center hole on the playback disc, the information extracted from the disc will have a recurrent or periodic velocity error. This velocity error manifests itself as frequency modulation of the extracted video information and causes undulations in the vertically disposed image components displayed on the video monitor. Deviations in concentricity between the spiral groove and center hole in the disc may result from errors which occur during the early stages of playback disc formation such as during the mastering process or in the centering of the stamper in the stamping press. In the mastering process, the lacquer-coated aluminum disc may be imperfectly centered on the turntable of the spiral-cutting lathe. Such a deviation in centering causes the formation of the spiral groove to be about an apparent center rather than the actual one. If the center hole of the lacquer-coated disc is utilized as a means for locating the center hole in a stamper, and thereby center holes in the embossed or pressed playback discs, then such a centering error in the lacquer-coated disc would be undesirably transferred to the playback discs.

A similar centering error may occur if the center of the stamper is located by, for example, rotating the stamper on a turntable and continuously repositioning the stamper on the turntable until a groove located near the outside of the stamper disc appears to remain stationary during rotation. This method of centering is not precisely accurate and may result in erroneous location of the center of the stamper and consequently error in the location of the center of the embossed or pressed disc.

SUMMARY OF THE INVENTION

A system for providing a center hole in a video disc that is concentric with an information groove comprises a turntable upon which a disc of formable material may be rotated. A forming or cutting means is mounted with respect to the turntable for forming a closed convolution of predetermined diameter in the disc. Further means, also mounted with respect to the turntable are provided for forming or cutting a spiral depression in the disc concentric with and at a radius greater than the closed convolution. An information forming means operates upon the formable disc for forming an information representative topography in the spiral depression.

A better understanding of the invention may be derived from the following detailed description in connection with the accompanying drawings, of which:

Figure 1:
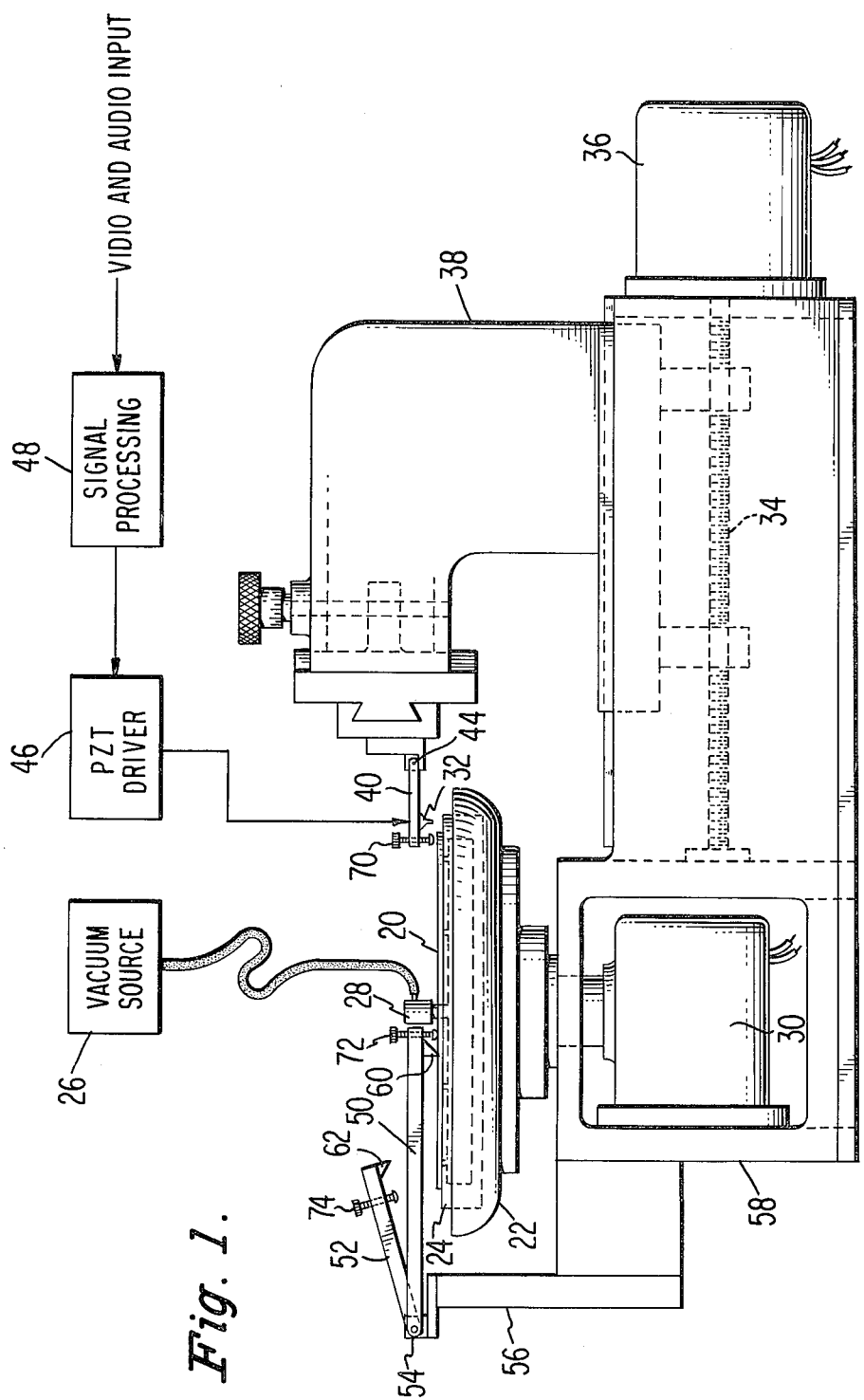
FIG. 1 is a diagrammatic representation of a groove-cutting lathe useful in practicing the invention.

In FIG. 1 a disc 20 is seated on a turntable 22. Disc 20 comprises, for example, an aluminum disc of about 14 inch diameter and ½ inch thick machined to a flatness of about 0.0005 inch and upon the surface of which a uniform coating of about 5 mils thick lacquer has been formed. A vacuum pad 24 is interposed between the turntable 22 and the disc 20 and functionally operates to retain disc 20 upon turntable 22. A vacuum source 26 is coupled to vacuum pad 24 through a spindle 28 which passes through the apparent center of the disc and the center of the turntable 22. Turntable 22 is rotated at a relatively constant velocity of, for example, about 15 rpm by a synchronous motor 30.

In the formation of a spiral groove or depression in the disc 20, a cutting stylus 32 is caused to impinge upon the disc's surface and slowly traverse the disc along a radius. An advance ball 70, located adjacent cutting stylus 32 is adjusted to ride on the uncut portion of disc 20 and prevent stylus 32 from cutting into disc 20 to more than a predetermined depth. A lead screw 34 rotated by a further synchronous motor 36 causes cutting stylus mounting stock 38 to traverse along a radius of the disc at a substantially constant velocity. A stylus mounting arm 40 is hinged to stock 38 at a hinge 44 and is arranged so that the cutting stylus 32 can be lifted from the lacquer-coated disc at the end of the spiral cutting operation. Audio, video and synchronizing signal information to be recorded on the disc is coupled to signal processing circuitry 48 wherein the signal is translated onto an FM carrier. The FM carrier signal is coupled to a PZT driver 46 and from there to the cutting stylus 32. FM representative information signals driving the piezoelectric material cause stylus 32 to topographically form an information pattern in disc 20 concurrently with the formation of the spiral groove.

Closed convolution cutters 50 and 52 are mounted by a hinge 54 to a member 56 affixed to cutting lathe bed 58. Cutter 50 has a stylus 60 with a cutting edge arranged a predetermined distance from the center of spindle 28. An advance ball 72, mounted on cutter 50, inhibits the depth to which stylus 60 may cut. When stylus 60 is lowered to impinge upon the rotating disc 20, a closed V-shaped convolution having an acute angle is inscribed in disc 20 at a predetermined diameter. The diameter selected for this inscribed convolution is typically of about 1 ½ and corresponds to a spindle diameter utilized in playing back the embossed or pressed playback disc. Cutter 52 has a stylus 62 arranged to impinge upon disc 20 at a radius less than, but close to the extreme radial measurement of disc 20. When stylus 62 is lowered to impinge upon disc 20, an advance ball 74, located adjacent stylus 62 allows this stylus to cut to a predetermined depth and a further closed convolution is formed therein. This closed convolution is utilized in the formation of the playback disc to form the outer perimeter of the embossed disc.

Figure 2:
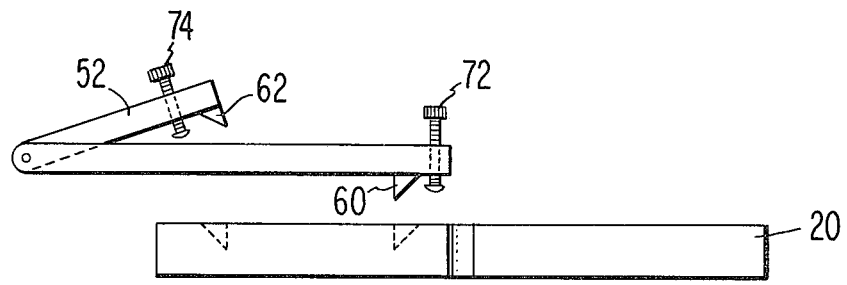
FIG. 2 is an enlarged diagrammatic representation of closed convolution cutters shown in FIG. 1.

FIG. 2 illustrates, in greater detail, the disc 20 and cutters 50 and 52. Stylus 60 is illustrated having a sloped edge of about 60° facing towards the inside (i.e., near the center) of the disc and a vertical edge facing towards the outside edge of the disc 20. In a complementary fashion, stylus 62 has a sloped edge of about 60° towards the outside of the disc and a vertical edge towards the inside. The vertical cutting edges correspond in position to the portion of the playback disc that is retained after stamping or embossing.

Figure 3:
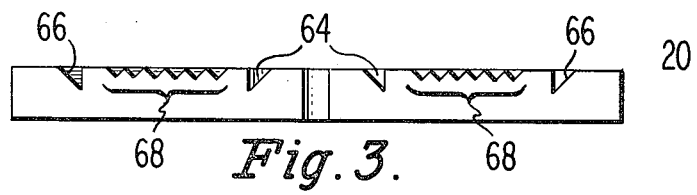
FIG. 3 is a cross-sectional view of a lacquer-coated disc with closed convolutions and spiral convolutions formed therein in accordance with the present invention.

FIG. 3 is a diagrammatic cross-sectional view of disc 20 having closed convolutions 64 and 66 formed therein by stylii 60 and 62 and spiral convolutions 68 formed by stylus 32. The closed convolutions 64 and 66 are formed to a greater depth than the spiral groove portions 68 for reasons to be explained later with reference to the stamper shown in FIG. 4.

Figure 4:
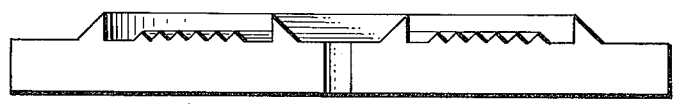
FIG. 4 is a diagrammatic representation of a stamper used for pressing or embossing discs in accordance with the present invention.
Figure 5:
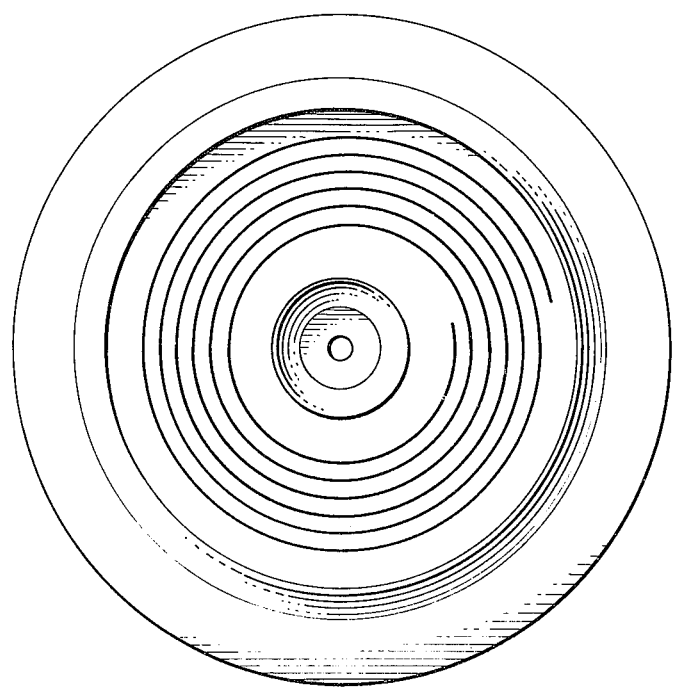
FIG. 5 is a plan view of the stamper shown in FIG. 4.

FIGS. 4 and 5 show a stamper replicated from the grooved substrate illustrated in FIG. 3 and mounted on a base plate. Stampers may be formed by a replication process known in the audio recording art, such as the following.

The grooved lacquer disc is first dipped in a colloidal solution containing stannous and stannic ions. This allows the lacquered surface to adsorb the ions and thereby sensitize the surface for subsequent nickel adhesion. The sensitized lacquer disc is thereafter dipped into a second solution of palladium chloride. The palladium chloride solution interchanges with the stannous ions, allowing pure palladium to be adsorbed on the surface of the disc. This coating of palladium on the disc surface provides the necessary catalytic action for electroless depositing of nickel on the disc. Hence, when the palladium-coated disc is immersed in a solution such as nickel chloride or nickel sulfate, pure nickel is taken from the ionized solution and deposited on the disc. In this nickel deposition process, 1 mil (0.001 inches) of bright nickel is deposited on the disc and thereafter 9 mils of sulfamate nickel is deposited. A more detailed description of such an electroless nickel deposition process may be found in U.S. Pat. No. 3,666,527, dated May 30, 1972, in the name of Nathan Feldstein, et al and assigned to RCA Corporation.

If playback discs are to be embossed in relatively thin thermoplastic material, for example, material of about 4 mils thick, then the depth of the inner and outer closed convolutions formed in the master and replicated in the stamper should be just less than the thickness of the thermoplastic material, i.e., less than 4 mils. When the closed convolutions are made to this depth (slightly less than 4 mils), the center portion and the portion adjacent to the outer perimeter may be easily removed from the spiral grooved area of the disc. Techniques utilizing, for example, compressed air to separate the center portion and the outer portion of the disc may be utilized allowing removal of these portions without physically handling the information storing portion of the disc. The hole formed thereby in the center of the disc will be concentric with the information storing spiral groove and the perimeter of the disc.

Formation of the center hole in thick discs, for example, those of about 1/16 inch thick material, may be achieved utilizing a similar technique to that described above. However, the closed convolutions formed in the lacquer-coated disc are made to a symmetrical cross-sectional shape by replacing the original cutting stylii 60 and 62 with symmetrically shaped stylii, isosceles in shape with an acute cutting angle of about 60°. The closed symmetrical convolutions formed in the lacquer are made to a depth of about 4 mils, and replicated by the process described above to the same height in a metal stamper. The closed convolution representative of the center hole lies on a fault line coincident with the peak of this formed convolution in the metal stamper. This fault line extends through the metal stamper perpendicular to the surface of this disc, allowing removal of this center portion from the stamper by punching along this fault line. To facilitate removal of this center portion, a "dinking" die readily may be positioned in the formed center groove and the center portion is removed by a punch having a slightly smaller diameter than the desired center hole. The stamper may now be positioned in a stamping or embossing press by utilizing a centering pin which has been formed within 1 mil to the diameter of the disc's center hole. This stamper will now be aligned in the press and may be subsequently aligned with a second stamper utilized for stamping the underside of the pressed plastic disc. Alignment of the two stampers is easily facilitated by utilizing the same centering pin in the press for aligning both upper and lower stampers.

Another method that may be utilized for centering the stamper in a stamping press utilizes a stamper having a center hole formed in the manner described above but smaller in diameter than the desired center hole in the embossed or stamped plastic disc. For example, if the desired center hole diameter in the stamped disc is 1 ½ inches, a center hole of 1 ¼ inches is formed in the stamper. A centering pin having a 1 ¼ inch diameter and concentric head portion 1 ½ inches in diameter is inserted through the stamper and is secured in the stamping press such that the head portion of the pin holds the stamper to the press. The head portion of the pin is formed to a cylindrical shape with a height equal to one-half the thickness of the pressed disc. When two stampers, one for each side of the pressed disc, are concurrently used to press a disc, the total height of the head portions of the centering pins equals the total thickness of the pressed disc. This total centering pin head thickness allows formation of a center hole in the stamped disc equal to the diameter of the head of the centering pin.

By utilizing the center forming techniques above described, discs having centers substantially concentric with the spiral information may be formed and velocity errors inherent in non-concentric discs may be substantially eliminated.

What is claimed is:

1. Apparatus for providing a centrally apertured disc with a replica disc center hole edge locator concentric with a spiral information groove, said apparatus comprising:

a turntable for receiving a centrally apertured disc and causing rotation thereof;

inscribing means, mounted with respect to said turntable so as to be subject to engagement with a surface of a disc during rotation thereof by said turntable, with said engagement being maitnained at a fixed distance from the center of rotation of said disc so that said inscribing means serves to cut, in a region of said disc surrounding and spaced from the central aperture thereof, a closed circular groove of a predetermined depth and a first diameter, centered about said center of rotation of said disc; and means, subject to radial motion with respect to said turntable during said rotation of said disc, for forming an information storing groove in said surface of said disc in a spiral configuration centered about said center of rotation of said disc, with all of the convolutions of said spiral groove having a greater diameter than said first diameter and with the maximum depth of said information storing groove being small relative to said predetermined depth.

2. Apparatus according to claim 1 wherein: said inscribing means includes a cutting stylus coupled to an arm, said arm being arranged to pivot in a vertical plane about a position fixed with respect to said turntable for providing impingement of said stylus upon said disc.

3. Apparatus according to claim 2 wherein: said stylus is adapted to provide a V-shaped groove in said disc, the intersecting sides of said groove forming an acute angle.

4. Apparatus according to claim 1 wherein:
said inscribing means is shaped so as to form said circular groove with a side wall remote from said center of rotation of said disc which extends in a substantially perpendicular relationship to said surface of said disc.

5. Apparatus according to claim 3 wherein: said stylus is adapted to form a groove having sides disposed at a substantially equal angle from a line perpendicular to the surface of said disc such that a positive replica of such disc has a fault line about the valley of said groove and substantially perpendicular to the surface of said replica.

* * * * *